(12) United States Patent
Mueller et al.

(10) Patent No.: US 11,318,639 B2
(45) Date of Patent: *May 3, 2022

(54) MOLDING APPARATUS AND PROCESS

(71) Applicant: KNAUF INSULATION, INC., Shelbyville, IN (US)

(72) Inventors: Gert R. Mueller, New Albany, OH (US); Robert W. Zembrodt, Indianapolis, IN (US); Charles Fitch Appley, Cumberland, IN (US); Walter A. Johnson, Columbus, IN (US); Steven Lee Collings, Greenfield, IN (US)

(73) Assignee: Knauf Insulation, Inc., Shelbyville, IN (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/000,247

(22) Filed: Aug. 21, 2020

(65) Prior Publication Data

US 2020/0384668 A1 Dec. 10, 2020

Related U.S. Application Data

(63) Continuation of application No. 15/841,187, filed on Dec. 13, 2017, now Pat. No. 10,889,026, which is a
(Continued)

(51) Int. Cl.
*B29C 33/04* (2006.01)
*B29C 35/04* (2006.01)
(Continued)

(52) U.S. Cl.
CPC ............ *B29C 33/046* (2013.01); *B29C 35/04* (2013.01); *B29C 35/045* (2013.01); *B28B 1/52* (2013.01); *B29C 33/048* (2013.01); *B29C 35/049* (2013.01); *B29K 2105/06* (2013.01); *B29K 2105/246* (2013.01);
(Continued)

(58) Field of Classification Search
CPC ..... B29C 33/046; B29C 33/049; B29C 35/04; B29C 35/045; B29C 35/049
See application file for complete search history.

(56) References Cited

U.S. PATENT DOCUMENTS 3,280,237 A 10/1966 Corbin et al.
3,891,738 A 6/1975 Shen
(Continued)

FOREIGN PATENT DOCUMENTS

DE 4142261 A1 6/1993
DE 4233622 A1 4/1994
(Continued)

OTHER PUBLICATIONS

International Search Report received for PCT Application No. PCT/US2013/037129, dated Aug. 2, 2013, 3 pages.
(Continued)

*Primary Examiner* — Atul P. Khare
(74) *Attorney, Agent, or Firm* — Knauf Insulation, Inc.; James K. Blodgett (57) ABSTRACT

A molding process includes the operation of placing insulation material comprising fibers and binder on the fibers in a mold cavity. The molding process further includes the step of transferring heat to the insulation material to cause the binder to cure.

10 Claims, 11 Drawing Sheets

Related U.S. Application Data continuation of application No. 14/394,665, filed as application No. PCT/US2013/037129 on Apr. 18, 2013, now abandoned.

(60) Provisional application No. 61/779,713, filed on Mar. 13, 2013, provisional application No. 61/625,888, filed on Apr. 18, 2012.

(51) Int. Cl.
| | | |
|---|---|---|
| B29L 7/00 | (2006.01) | |
| B29K 105/06 | (2006.01) | |
| B29L 9/00 | (2006.01) | |
| B28B 1/52 | (2006.01) | |
| B29K 105/24 | (2006.01) | |

(52) U.S. Cl.
CPC ............... B29K 2995/0002 (2013.01); B29K 2995/0015 (2013.01); B29L 2007/00 (2013.01); B29L 2007/002 (2013.01); B29L 2009/00 (2013.01); B32B 2310/0454 (2013.01); B32B 2317/10 (2013.01)

(56) References Cited

U.S. PATENT DOCUMENTS

| | | | |
|---|---|---|---|
| 4,115,498 | A | 9/1978 | Kissell et al. |
| 4,379,101 | A | 4/1983 | Smith |
| 4,393,019 | A | 7/1983 | Geimer |
| 4,517,147 | A | 5/1985 | Taylor et al. |
| 4,609,519 | A | 9/1986 | Pichard et al. |
| 4,786,351 | A | 11/1988 | Elliott et al. |
| 4,850,849 | A | 7/1989 | Hsu |
| 5,087,311 | A | 2/1992 | Elliott et al. |
| 5,318,990 | A | 6/1994 | Strauss |
| 5,820,801 | A | 10/1998 | Greve |
| 5,824,246 | A | 10/1998 | Reetz et al. |
| 5,902,442 | A | 5/1999 | Phillips et al. |
| 5,977,232 | A | 11/1999 | Arkens et al. |
| 6,194,512 | B1 | 2/2001 | Chen et al. |
| 6,344,165 | B1 | 2/2002 | Coleman |
| 6,471,897 | B1 | 10/2002 | Walsh et al. |
| 6,699,945 | B1 | 3/2004 | Chen et al. |
| 7,220,375 | B2 | 5/2007 | Haas et al. |
| 7,803,879 | B2 | 9/2010 | Srinivasan et al. |
| 7,854,980 | B2 | 12/2010 | Jackson et al. |
| 7,872,088 | B2 | 1/2011 | Miller et al. |
| 8,114,210 | B2 | 2/2012 | Hampson et al. |
| 2007/0292619 | A1 | 12/2007 | Srinivasan et al. |
| 2009/0275699 | A1 | 11/2009 | Zhang et al. |

FOREIGN PATENT DOCUMENTS

| | | |
|---|---|---|
| EP | 1732968 A1 | 12/2006 |
| EP | 2199332 A1 | 6/2010 |
| EP | 2386394 A1 | 11/2011 |
| WO | 2005/087837 A1 | 9/2005 |
| WO | 2007/014236 A2 | 2/2007 |
| WO | 2011/022668 A1 | 2/2011 |
| WO | 2011/138459 A1 | 11/2011 |

OTHER PUBLICATIONS

Written Opinion received for PCT Application No. PCT/US2013/037129, dated Aug. 2, 2013, 8 pages.

Office action for co-pending U.S. Appl. No. 14/394,665 (11 pages)—dated Jul. 13, 2017.

Contours of tf (Time=1.0000e+01)         Jan 21, 2013

ANSYS Fluent 14.5 (3d, dp, pbns, rke, transient)

*FIG. 10*

Contours of tf (Time=3.0000e+01)         Jan 21, 2013

ANSYS Fluent 14.5 (3d, dp, pbns, rke, transient)

*FIG. 11*

Contours of tf (Time=6.0000e+01)  Jan 21, 2013

ANSYS Fluent 14.5 (3d, dp, pbns, rke, transient)

*FIG. 12*

Contours of tf (Time=2.1100e+02)  Jan 21, 2013

ANSYS Fluent 14.5 (3d, dp, pbns, rke, transient)

*FIG. 13*

Contours of Z Velocity (m/s) (Time=3.0000e+01)   Jan 07, 2013
ANSYS Fluent 14.5 (3d, dp, pbns, rke, transient)

*FIG. 14*

Contours of tm (Time=3.0000e+01)   Jan 07, 2013
ANSYS Fluent 14.5 (3d, dp, pbns, rke, transient)

*FIG. 15*

Contours of tf (Time=3.0000e+01)  Jan 07, 2013
ANSYS Fluent 14.5 (3d, dp, pbns, rke, transient)

*FIG. 16*

Contours of tf (Time=3.5380e+02)                Jan 04, 2013
ANSYS Fluent 14.5 (3d, dp, pbns, rke, transient)

*FIG. 17*

Contours of Velocity Magnitude (m/s) (Time=3.5380e+02)   Jan 04, 2013
ANSYS Fluent 14.5 (3d, dp, pbns, rke, transient)

*FIG. 18*

MOLDING APPARATUS AND PROCESS

CROSS-REFERENCE TO RELATED APPLICATIONS

This application is a continuation of U.S. application Ser. No. 15/841,187, filed Dec. 13, 2017, which is a continuation of U.S. application Ser. No. 14/394,665, filed Oct. 15, 2014, which is a U.S. national counterpart application of International Application Serial No. PCT/US2013/037,129, filed Apr. 18, 2013, under 35 U.S.C. § 371, which claims priority under 35 U.S.C. § 119(e) to U.S. Provisional Application Ser. No. 61/625,888, filed Apr. 18, 2012, and to U.S. Provisional Application Ser. No. 61/779,713, filed Mar. 13, 2013, the entire disclosures of which are expressly incorporated by reference herein.

BACKGROUND

The present disclosure relates to a process for making an insulation product, and particularly to a molding process. More particularly, the present disclosure relates to a molding process for making an insulation product where binder included in the insulation product is cured during the molding process.

SUMMARY

A mold for manufacturing a cured product may include a first mold tool and a second mold tool. The second mold tool may be coupled to the first mold tool to move relative to the first mold tool between an opened position and a closed position in which a mold cavity is formed between the first and second mold tools when the second mold tool is in the closed position.

In some embodiments, a molding system may include a first mold unit and a second mold unit. The second mold unit may move relative to the first mold unit between an opened position and a closed position in which a mold cavity may be formed between the first and second mold units when the second mold unit is in the closed position. The second mold unit may be coupled to a heat source to cause the second mold unit to have a molding temperature. The molding temperature may be configured to cure a binder included in an uncured blank.

In some embodiments, the first mold unit may be formed to include a passageway in fluid connection with a source of pressurized gas. The first mold unit may further be formed to include an array of holes formed in the first mold unit that are arranged to open into the passageway to cause pressurized gas to be communicated from the passageway to the mold cavity when the second mold unit is in the closed position. As the pressurized gas flows through the passageway, heat may be transferred from the mold unit to the pressurized gas to cause a hot pressurized gas to be established prior to the hot pressurized gas entering the mold cavity.

In some embodiments, the second mold unit may be formed to include a passageway in fluid connection with a source of pressurized gas. The second mold unit may be further formed to include an array of holes formed in the second mold unit that are arranged to open into the passageway to cause pressurized gas to be communicated from the passageway to the mold cavity when the second mold unit is in the closed position. As the pressurized gas flows through the passageway, heat may be transferred from the mold unit to the pressurized gas to cause a hot pressurized gas to be established prior to the hot pressurized gas entering the mold cavity.

In some embodiments, the first and second mold units may each be formed to include a passageway in fluid connection with a source of pressurized gas. Each mold unit may be further formed to include an array of holes that are arranged to open into the passageway of each mold unit to cause pressurized gas to be communicated from each passageway to the mold cavity when the mold units are in the closed position. As the pressurized gas flows through the passageways, heat may be transferred from the mold units to the pressurized gas to cause hot pressurized gas to be established prior to the hot pressurized gas entering the mold cavity.

In some embodiments, the hot pressurized gas may have a hot-gas temperature. The hot-gas temperature may be about equal to the molding temperature. The hot-gas temperature may be at least about 100 degrees Fahrenheit, for example at least: about 120 degrees Fahrenheit, about 150 degrees Fahrenheit, about 200 degrees Fahrenheit, about 250 degrees Fahrenheit, or about 300 degrees Fahrenheit. The hot-gas temperature may be no more than about 500 degrees Fahrenheit, for example no more than: about 450 degrees Fahrenheit, about 400 degrees Fahrenheit, or about 350 degrees Fahrenheit.

In some embodiments, the passage may include a perimeter portion and a distribution portion. The perimeter portion may be arranged to extend around a perimeter of the second mold unit to cause heat to be transferred from the second mold unit to the pressurized gas to establish the hot pressurized gas. The distribution portion may be in fluid communication with the perimeter portion and in fluid communication with the array of holes to cause the hot pressurized gas to be delivered to the mold cavity. The passageway may be configured to cause the hot-gas temperature of the hot pressurized gas to be achieved prior to the hot pressurized gas moving through the array of holes.

In some embodiments, the pressurized gas may have a cold-gas temperature. The cold-gas temperature may be about equal to room temperature. The cold-gas temperature may be no more than about 80 degrees Fahrenheit, for example no more than: about 70 degrees Fahrenheit, or about 60 degrees Fahrenheit. The cold-gas temperature may be at least about 50 degrees Fahrenheit, for example at least about 40 degrees Fahrenheit.

A molding process may include several steps. The molding process may include a step of inserting an uncured blank in a mold cavity formed in a mold system. The uncured blank may include fiber and uncured binder, In some embodiments, the molding process may include a step of transferring heat from the mold system to a cool pressurized gas to establish a hot pressurized gas. The molding process may include a step of injecting the hot pressurized gas into the mold cavity.

In some embodiments, the molding process may include a step of transferring heat from the hot pressurized gas to the uncured blank to cause the uncured binder to cure and establish a cured product. The molding process may include a step of transferring heat from the mold system to the uncured blank to cause uncured binder to cure.

In some embodiments, the uncured binder may be substantially free of formaldehyde. The binder may be based on a carbohydrate component/nitrogen-containing component binder system, i.e. the carbohydrate component(s) and nitrogen-containing component(s) may be the major components of the uncured binder. Accordingly, the total amount of the at least one carbohydrate component and the at least one nitrogen-containing component in the uncured binder by dry weight may be at least 20 wt.-%, based on the total weight of the uncured binder. For example, the total amount of the at least one carbohydrate component and the at least one nitrogen-containing component by dry weight of the uncured binder may be at least 30 wt.-%, 40 wt.-%, 50 wt.-%, 60 wt.-%, 70 wt.-%, 80 wt.-%, 90 wt.-%, 95 wt.-%, or 98 wt.-%.

The amount of binder present by weight in the molded product, expressed as Loss on Ignition (LOI), may be no more than about 25%, for example no more than: about 20% or about 18%; it may be at least 5%, for example at least: about 8%, about 10% or about 12%.

The cycle time to produce a molded product may be no more than about 10 minutes, for example, no more than: about 9 minutes, about 8 minutes, about 7 minutes, about 6 minutes, or about 5 minutes. The cycle time may be at least about 30 seconds, for example at least: about 60 seconds or about 90 seconds.

The cycle time to produce a shape-molded product may be no more than about 10 minutes, for example, no more than: about 9 minutes, about 8 minutes, about 7 minutes, about 6 minutes, or about 5 minutes. The cycle time may be at least about 30 seconds, for example at least: about 60 seconds or about 90 seconds.

The molded product may be a mineral wool insulation product, for example a glass wool or stone wool insulation product. The cured product may have a thermal conductivity of no more than about 0.04 W/mK, for example no more than: about 0.035 W/mK or about 0.033 W/mK. The cured product may by an acoustical mineral insulation product.

The molded product may have a thickness of at least about ⅛ inch, for example at least: about ¼ inch, about ¾ inch, or about one inch. The molded product may have a thickness of no more than about four inches, for example no more than: about three inches, about 2.5 inches, or about 2.25 inches.

The molded product may have a density of at least about 0.6 pounds per cubic foot, for example at least: about one pound per cubic foot, about 1.2 pounds per cubic foot, or about 1.6 pounds per cubic foot. The molded product may have a density of no more than about 13 pounds per cubic foot, for example no more than: about 10 pounds per cubic foot, about 8 pounds per cubic foot, or about 6 pounds per cubic foot.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
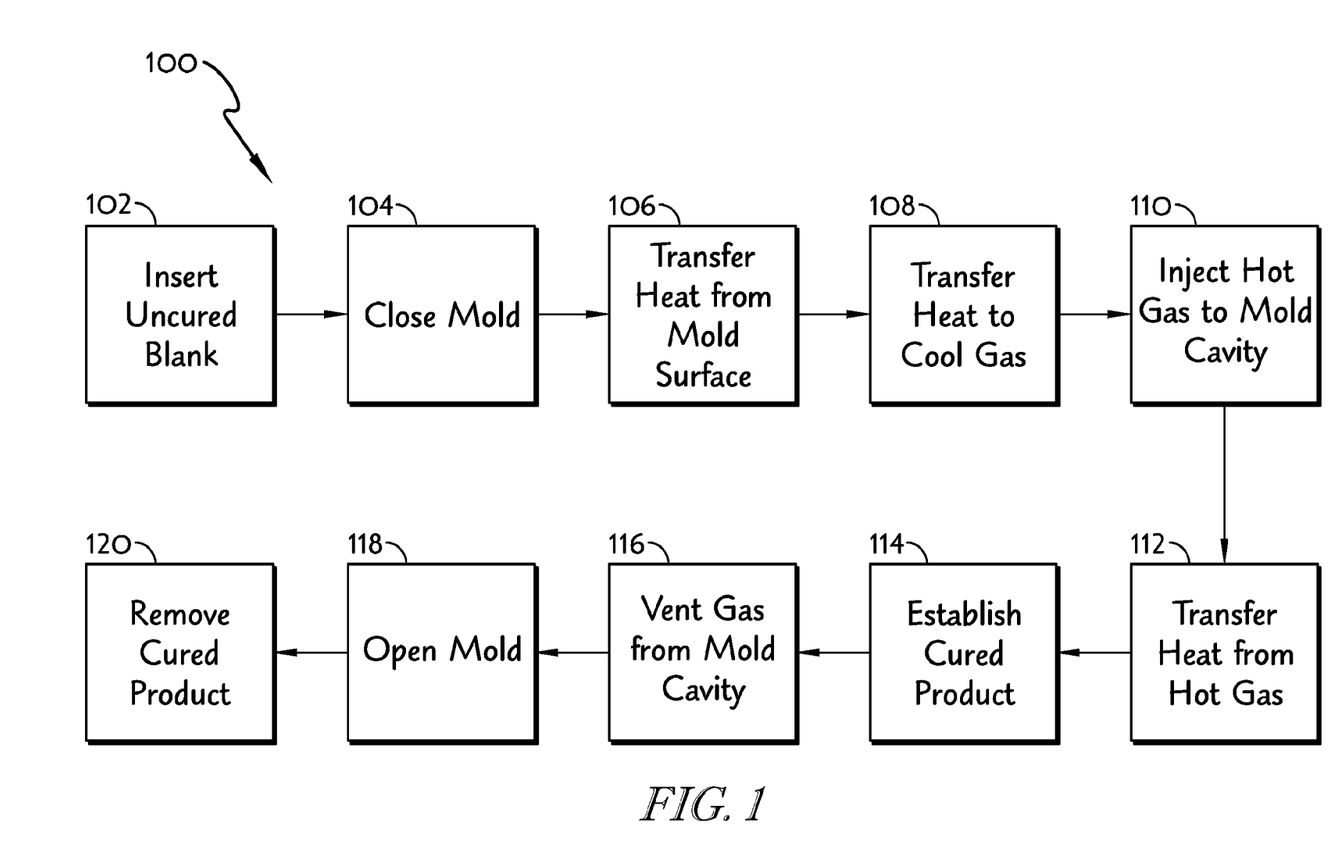
FIG. 1 is diagrammatic view of a molding process in accordance with the present disclosure.

A molding system 10 in accordance with the present disclosure includes a first mold unit 11 and a second mold unit 12 as suggested in FIGS. 2-7. Together, the first and second mold units 11, 12 cooperate to define a mold cavity 14 there between that is formed in the molding system. During a molding process 100, an uncured product is located between the mold units 11, 12 in the mold cavity 14 where heat and pressure are applied to the uncured product to provide a cured product as shown in FIG. 1. The uncured product includes uncured binder and fibers. In one example, the fibers are glass.

Figure 3:
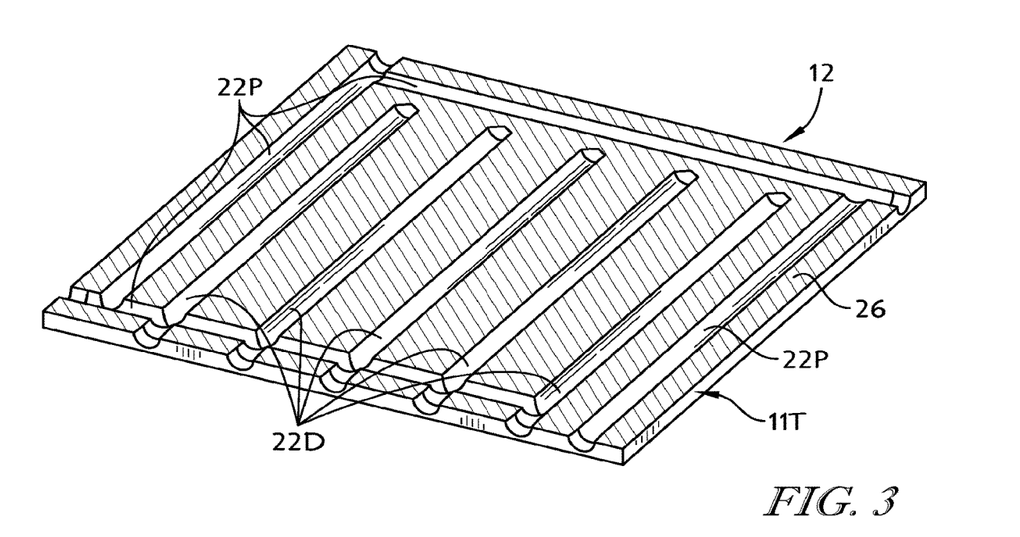
FIG. 3 is a partial perspective view of the mold tool of FIG. 2 showing a series of passageways drilled into the mold tool in a pattern configured to provide sufficient time for heat to be transferred to cold pressurized gas introduced into the passageways along a front right corner of the mold tool so that a hot pressurized gas flows through the array of holes formed in the inner surface of the mold tool.
Figure 7:
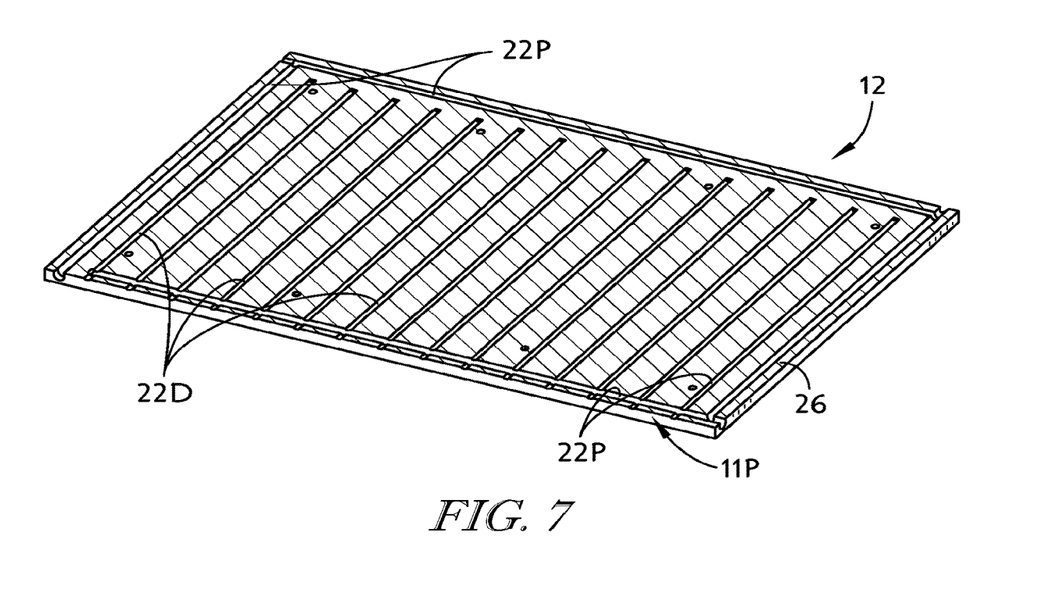
FIG. 7 is a partial perspective view of the heated platen of FIGS. 4-6 showing that a heating passageway is formed in the heated platen which receives cold pressurized gas at a bottom left of the heated platen and moves the cold pressurized gas along a perimeter of the platen to transfer heat to the cold pressurized gas to provide the hot pressurized gas before the hot pressurized gas is communicated to the air passageways and through the holes.

Each mold unit 11, 12 is formed to include an inner surface 20 configured to engage and mate with the uncured product and provide a shape to the cured product. Each mold unit 11, 12 is formed to include a passageway 22 through which a pressurized gas is communicated thereto as shown in FIGS. 3 and 7. An array 24 of holes is formed in the inner surface 20 of each mold unit 11, 12 and each hole is arranged to open into the passageway 22 to allow the pressurized gas to move from a gas source, through the passageway 22, out of the array 24 of holes, and into the mold cavity 14.

In one example, the mold unit 11 is a platen 11P used to form relatively flat cured products as suggested in FIGS. 4-7. In another example, the mold unit 11 is a tool 11T used to form contoured or curved cured products as suggested in FIGS. 2 and 3. The mold unit 11 is made, for example, of metal and heated so that the mold unit 11 remains hot throughout the molding process 100.

In an example of use, pressurized gas is provided by a gas source at a relatively cool temperature. The cool temperature may be about 70 degrees Fahrenheit. The pressurized gas is provided to the passageway 22 where the gas moves through a perimeter portion 22P of the passageway which extends along a perimeter 26 of the mold unit as suggested in FIGS. 3 and 7. As the pressurized gas moves along the perimeter portion 22P of the passageway 22, heat from the mold unit 11 is transferred to the pressurized gas to provide a hot pressurized gas that is then admitted to a distribution portion 22D of the passageway as shown in FIGS. 3 and 7. The hot gas is then discharged from the distribution portion 22D through the array 24 of holes into the uncured product located in the mold cavity 14.

Uncured binder included in the uncured product is cured through the application of heat so that a cured product is provided. Heat is transferred to the uncured product by conduction from the mold unit 11 and through convection from the hot gas. In one example, an uncured product, labeled Sample 1 in Table 1 below, is cured in a mold unit by only conduction in about 7.1 minutes.

In comparison, the same uncured product is cured in the same mold unit using conduction and convection in about 2.0 minutes. In Sample 1, the binder used in the uncured product is a substantially formaldehyde-free binder. The addition of convective heat transfer via the hot gas causes at least a 70% decrease in cycle time when using a substantially formaldehyde-free binder.

Examples of formaldehyde-free binders and their chemistry are described in U.S. Pat. Nos. 7,854,980 B2, 5,977,232, 7,803,879, 6,699,945, 5,318,990, 6,194,512, PCT publication PCT/US2006/028929, U.S. application Ser. Nos. 11/675,413, 12/599,858, WO2011/138459 A1 and WO2011/022668, EP1 732968, Patent Applications EP2386394 and EP2199332A1, Patent Applications US2009/0275699, and 2007/0292619 (each of which is incorporated by reference herein).

In comparison, another uncured product, labeled Sample 4 in Table 1 below, is cured in a mold unit by only conduction in about three minutes. In comparison, the same uncured product is cured in the same mold unit using conduction and convection in about 1.5 minutes. In Sample 4, the binder used in the uncured product is phenol-formaldehyde (PF) binder which may cure faster at lower temperatures. The addition of convective heat transfer via the hot gas causes at least a 50% decrease in cycle time when using a PF binder.

TABLE 1

Comparison of cycle times to full cure of an uncured product for various product types and binder types.

| | | Cycle time (min) | |
| --- | --- | --- | --- |
| Sample | | Full Cure No Convection Heating | Full Cure with Convection Heating |
| 1 | Formaldehyde-Free Binder, 16/9 (top/bottom) holes/sq.ft., 4 lb/cubic foot density, 15% LOI, 1 inch Loft, 380 degrees Fahrenheit, staggered hole locations, 6 scfm per mold tool, 12 scfm total | 7.10 | 2.00 |
| 2 | Formaldehyde-Free Binder, 16/9 (top/bottom) holes/sq.ft., 4 lb/cubic foot density, 15% LOI, 1 inch Loft, 380 degrees Fahrenheit, staggered hold locations 12 scfm top mold tool, 10 scfm bottom mold tool, 22 scfm total | 7.1 | 1.5 |
| 3 | Formaldehyde-Free Binder, 177/177 (top/bottom) holes/sq.ft., 4 lb/cubic foot density, 15% LOI, 1 inch Loft, 380 degrees Fahrenheit, aligned hole locations, 12 scfm per mold tool, 24 scfm total | 7.1 | 1.2 |
| 4 | PF Binder, 16/9 (top/bottom) holes/sq.ft., 4 lb/cubic foot density, 15% LOI, 1 inch Loft, 380 degrees Fahrenheit, 6 scfm per mold tool, 12 scfm total | 3.00 | 1.50 |

A molding process 100 in accordance with the present disclosure uses the molding system 10 of the present disclosure as shown in FIG. 1. The molding process 100 includes several operations that provide a hot gas to an uncured blank located in the mold cavity 14 of the mold system to cause curing of uncured binder included in the uncured blank to be cured via convective heat transfer from the hot gas to the uncured blank.

In the example, the uncured blank includes an outer trim layer, a first blanket, a second blanket, and an inner trim layer. Each blanket is made of a substrate and an uncured binder. In one example, the substrate is a fiber. For example, the fiber is glass, cellulose, or mineral wool. In still yet another example, the substrate may be a laminate or a veneer. For example, the laminate or veneer is a wood chip or wood particle. In addition, the uncured blank may have any number of blankets and trim layers. In addition, the uncured blank may include a thermoplastic layer, also called an interleaf, located between each neighboring pair of blankets to interconnect the neighboring pairs of blankets. The thermoplastic layer may also be located between the trim layer and the blanket.

As shown in FIG. 1, the molding process 100 begins with an operation 102 in which an uncured blank is inserted into the mold cavity 14 of the molding system 10. The molding process 100 then proceeds to an operation 104 in which the molding system 10 is moved to the closed position trapping the uncured blank in the mold cavity 14. The molding process 100 then proceeds to an operation 106 in which heat is transferred from the inner surface 20 of the mold system 28 to the uncured blank via conductive heat transfer to begin curing the binder included in the uncured blank as suggested in FIG. 1.

The molding process 100 then proceeds to an operation 108 in which heat is transferred from the molding system 10 to a cool pressurized gas to establish a hot pressurized gas as suggested in FIG. 1. The cool pressurized gas, for example, has a temperature of about 74 degrees Fahrenheit. In another example, the cool pressurized gas has a temperature similar to room temperature. The hot pressurized gas, for example, has a temperature of about 100 degrees Fahrenheit to about 300 degrees Fahrenheit. In another example, the hot pressurized gas has a temperature of about 300 degrees Fahrenheit to about 500 degrees Fahrenheit.

Once the hot pressurized gas is established, the molding process 100 proceeds to an operation 110 as shown in FIG. 1. During the operation 110, the hot pressurized gas is injected through the array 24 of holes formed in the inner surface 20 into the mold cavity of the molding system 10.

The molding process 100 then proceeds to an operation 112 in which heat from the hot pressurized gas is transferred from the hot pressurized gas to the uncured blank via convective heat transfer. As a result, uncured binder included in the uncured blank is cured at a relatively faster rate than the conductive heat transfer alone. In one example, the array 24 of holes may be configured to move more hot pressurized gas through specific areas of the uncured blank that may require increased heat flux.

The molding process 100 then proceeds to an operation 114 in which the cured product is established. The cured product has had sufficient heat transferred to the uncured blank to cause substantially all of the binder to be cured.

The molding process 100 then proceeds to an operation 116 in which the pressurized gas is vented from the mold cavity 14. Venting may occur on the other mold unit 11, 12 if only one mold unit 11, 12 includes the array 24 of holes. Venting may also occur on an edge of the mold system as described earlier. Venting may also be continuous or intermittent. Venting through a perimeter of the cured product minimizes the risk of fouling of the array 24 of holes and the passageway 22 in the mold units 11, 12 due to condensate formation and minimizes the need for cleaning and maintenance.

The molding process 100 then proceeds to an operation 118 in which the molding system 10 is opened to allow access to the mold cavity 14. The process then proceeds to an operation 120 in which the cured product is removed from the mold cavity 14 as suggested in FIG. 1.

The molding process 100 may be used with existing infrastructure. As a result, capital costs may be minimized when implementing the molding process 100. For example, an existing mold tool may be drilled to form the passageways and holes so that pressurized gas may be heated and transferred to the mold cavity.

The molding process 100 also provides for even curing of the binder included in the uncured blank. The molding process 100 achieves this result by minimizing a temperature gradient between the surface temperature of the inner surface 20 of the molding system 10 and the core temperature of the cured product. In addition, the entire uncured blank may heat up evenly with minimal temperature variations. As a result hot and cold spots in the uncured blank may be minimized.

The molding process 100 may also provide for dimensionally stable cured products with maximized through-put and reliability. The molding process 100 also provides for consistently fully cured products. The cured products are formed in a mold system with a minimum cycle time regardless of product variations (product density, binder distribution, binder gobs, binder wet spots, etc.) The molding process 100 also is configured to provide cured products including a non-permeable membrane or barrier.

In a modified molding process, the molding process 100 may be used to shape mold the uncured blank. Shape molding is a process by which the uncured blank is intentionally only partly cured. The degree of cure is generally chosen to ensure that the uncured blank retains its shape from the molding system 10 and satisfies all dimensional requirements when the shaped product is removed from the mold cavity 14. Some portions of a shaped product, typically portions in the core, are not fully cured. The shape-molded part is subjected to a subsequent secondary curing process to ensure full cure.

As an example, the shape-molding process allows for relatively short cycle times and simplified design of the array 24 of holes. It was found that the molding process 100 provides for relatively short shape-molding times. The shaped products are then subjected to a secondary curing process, for instance heating the parts in-line or in a batch. It was found that the secondary curing step is a suitable process to obtain consistently cured products independent of product variations (i.e. variations of product density, wet spots, binder globs, etc.)

In one example, the mold units 11, 12 are platens. Platens are large, flat, heated plates that come together to apply pressure and heat to the uncured blank. The platens may be heated from an external source such as an oil heater. However, some are heated using electrical resistance. In the example of oil heat, the hot oil is pumped through passages in the platen and then returned to the heater. With either oil or electric heat, it should be possible to form the passageway 22 in the platens for passing the pressurized air into the mold cavity 14.

In another example, the mold units 11, 12 may be mold tools used to produce a shaped product other than a flat panel. Mold tools may be heated with hot oil, with electrical resistance, heated platens, or any combination thereof. The biggest difference between a platen and a mold tool is that the company that is molding parts will have the mold tools made to meet the dimensions and requirements of the part where as a platen is manufactured by the press manufacturer and is simpler in design and more straight forward in its ability to transfer heat.

The pressurized gas is passed through the passageway 22 and heat is transferred to the pressurized gas to establish a hot pressurized gas. The pressurized gas is provided by a source which may be regulated. The pressurized gas may be compressed air, for example, compressed air supplied at a relative pressure of greater than about 15 pounds per square inch, for example greater than: about 30 pounds per square inch or 46 pounds per square inch and/or less than about 140 pounds per square inch, for example less than about: 120 pounds per square inch or 100 pounds per square inch. The pressurized gas may be provided by a blower. The source should provide sufficient pressure to the pressurized gas to move the pressurized gas through the passageway 22, the array 24 of holes, and the uncured blank. However, the pressure should be limited so as not to damage the uncured blank.

In an example of use, the pressurized air flow is switched off when the molding system 10 is in the opened position and is not turned back on until the molding system 10 has returned to the closed position. In order to minimize cure cycle time and deformation of the cured product, the air flow may be increased gradually from low velocity to high velocity from start to end of the cure cycle. Steam may also be used instead of air. In the example of steam, initially some condensate may be formed within the cured product. The condensate may be removed by extending mold cycle time or a secondary heating process.

The molding process 100 and molding system 10 provide several surprising results. One surprising result is that despite the array 24 of holes and the passageway 22 not necessarily having even heat flow, the cured products show a relatively even cure and do not have localized cold spots. Another surprising result is that the molding process 100 provides cured products even when the uncured blank has portions that are relatively very dense that normally restrict air flow. Still yet another surprising result is that molding process 100 may be used with cured products including a membrane located in the middle of the cured product that may operate to restrict air flow. Another surprising result is that the molding process 100 and molding system 10 may be used to fully cure cured products in relatively very short cycle times as shown in Table 2 below. Finally, another surprising result is that the molding process 100 provides the cured product even when the cured product includes relatively heat sensitive materials.

The molding process 100 may include flow control elements to control the flow of the pressurized gas. As a result, heat transfer may be optimized.

Various binder chemistries may be used as part of the molding processes described herein. Furthermore, temperature sensitivity of the cured products may also be taken into account. While temperatures of the platens or mold tools may be increased to provide shorter cycle times, temperatures are limited to those temperatures where decomposition of the binder, the trim layer, the facing materials, and the cured product does not occur due to excessive heat.

In addition, existing platens and mold tools may be retrofitted to perform according the molding process 100 and establish the molding system 10 of the present disclosure. As a result, capital costs for implementing the molding process are minimized while obtaining minimized cycle time and the use of various binders.

Flow distribution of hot gas through the molded part may be optimized. Optimization may include optimizing the pattern of holes, hole size, and hole locations.

Cross flow through the uncured blank is possible. Cross flow may be used when a perimeter of the cured product is extremely dense. Extreme density at the perimeter edge may occur due to a pinched edge, for example.

TABLE 2

Comparison of cycle times to full cure of an uncured product for various product types and binder types with and without shape molding.

| Sample | | Cycle time (min) | | | |
|---|---|---|---|---|---|
| | | Shape Molding No Convection Heating | Shape Molding with Convection Heating | Full Cure No Convection Heating | Full Cure with Convection Heating |
| 1 | Formaldehyde-Free Binder, 16/9 (top/bottom) holes/sq.ft., 4 lb/cubic foot density, 15% LOI, 1 inch Loft, 380 degrees Fahrenheit, staggered hole locations, 6 scfm per mold tool, 12 scfm total | 5.5 | 1.0 | 7.1 | 2.0 |
| 2 | Formaldehyde-Free Binder, 16/9 (top/bottom) holes/sq.ft., 4 lb/cubic foot density, 15% LOI, 1 inch Loft, 380 degrees Fahrenheit, staggered hold locations 12 scfm top mold tool, 10 scfm bottom mold tool, 22 scfm total | 5.5 | 1.0 | 7.1 | 1.5 |
| 3 | Formaldehyde-Free Binder, 177/177 (top/bottom) holes/sq.ft., 4 lb/cubic foot density, 15% LOI, 1 inch Loft, 380 degrees Fahrenheit, aligned hole locations, 12 scfm per mold tool, 24 scfm total | 5.5 | | 7.1 | 1.2 |
| 4 | PF Binder, 16/9 (top/bottom) holes/sq.ft., 4 lb/cubic foot density, 15% LOI, 1 inch Loft, 380 degrees Fahrenheit, 6 scfm per mold tool, 12 scfm total | 3.0 | 1.0 | >3.0 | 1.5 |

Cycle time is reduced as a result of blowing, for example, air through heated platens or mold tools rather than blowing hot air through an unheated platen or tool. In addition, blowing hot air through an unheated platen or mold tool is needed to keep the platen or mold tool hot while the platen or mold tool is open. If this is not done, the platen or mold tool may cool and a longer cycle time may be needed. As a result of passing hot air through an unheated mold unit, energy efficiency is reduced.

The mold units 11, 12 may be formed to include the passageway 22. The passageway 22 may take on various shapes or patterns as may be needed for specific platen or mold unit 11, 12 designs. The passageway 22 includes a minimum passageway length that is a factor of desired gas flow rate, tool temperature, and required hot-gas temperature. In one illustrative example shown in FIGS. 3 and 7, the passageway 22 is formed along a perimeter of the mold tool (FIG. 3) and a perimeter of the platen (FIG. 7). After the cool gas is moved through the perimeter portion of the passageway 22, sufficient heat may have been transferred from the mold units 11, 12 to provide a hot gas having an evenly distributed temperature throughout before the hot gas moves through a distribution portion 22D of the passageway 22.

In one example, the passageway 22 is formed in a mold tool which is coupled to a platen to move therewith. The platen is formed to include an electrical or oil-based heating system which provides heat to the mold tool. However, the tool may be formed to include an electrical or oil-based heating system in addition to the air passageway as suggested in FIGS. 2-7.

Figure 5:
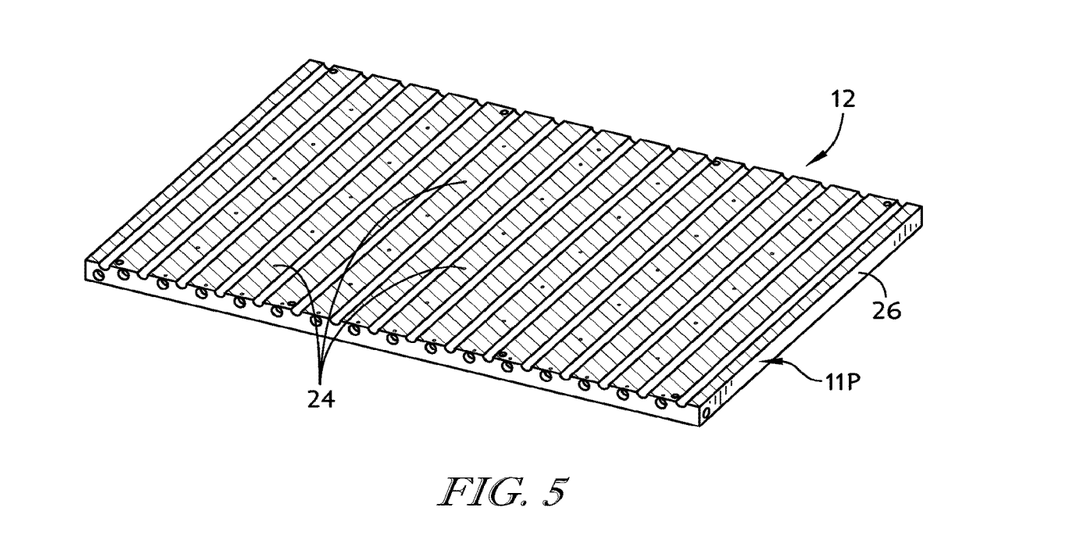
FIG. 5 is a partial perspective view of the electrically heated platen of FIG. 4 showing a series of grooves formed in the platen that are configured to receive associated electric heaters therein to heat the platen.
Figure 6:
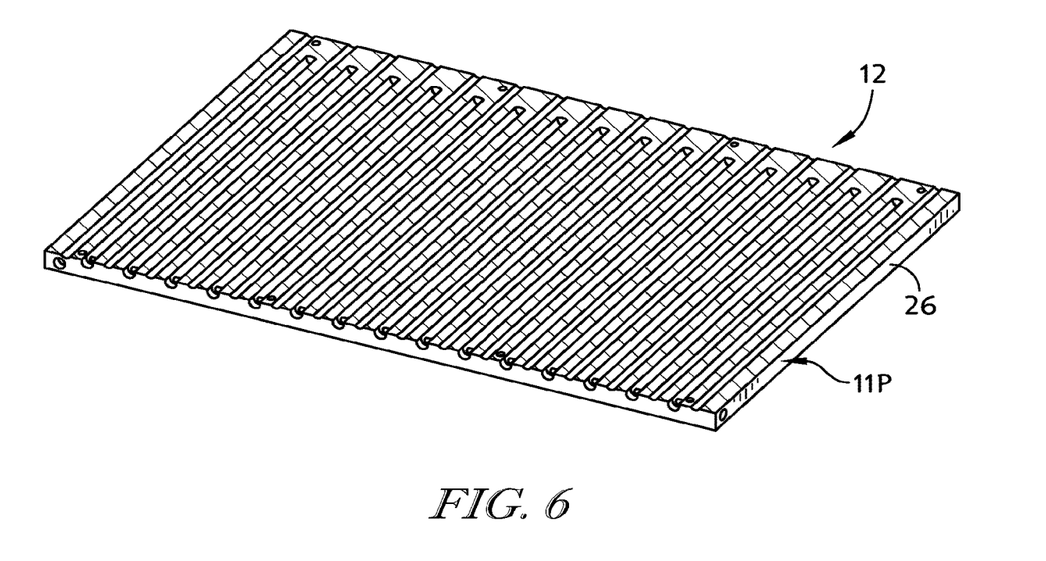
FIG. 6 is a partial perspective view of the heated platen of FIGS. 4 and 5 showing a series of air passageways drilled into the platen that are configured to communicate hot gas through holes and into the uncured part and that the series of passageways are located between the grooves formed in the platen for electric heaters.

A platen may be formed with a routing path for heating elements as shown in FIG. 5. The heating elements may be electrical pencil heaters. Each electrical pencil heater may be spaced apart from each neighboring electrical pencil a distance of about two inches to about six inches. In another example, a platen may be heated with hot oil that flows through a serpentine or snake-like channel system (plug flow, re-circulating heated oil). In another example, heating elements may be included in a tool where heat is transferred to the tool from a platen to compensate for locations in the tool where heating is uneven. Heating may be uneven as a result of having a large distance between the heated platen and the inner surface of the mold tool.

In some examples, heated platens may be used in place of mold tools when molding flat panel parts. Flat panel parts include, for example, panels used in office cubical walls. When platens are used to mold parts, heating elements and gas passageways may both be located in the platens. The location of both relative to each other can vary in a wide range, but proper heat transfer to the cold pressurized gas should be considered.

In instances where parts have curve(s) or are non-flat, mold tools may be used. Non-flat parts include, for example, hood liners for automobiles.

Figure 2:
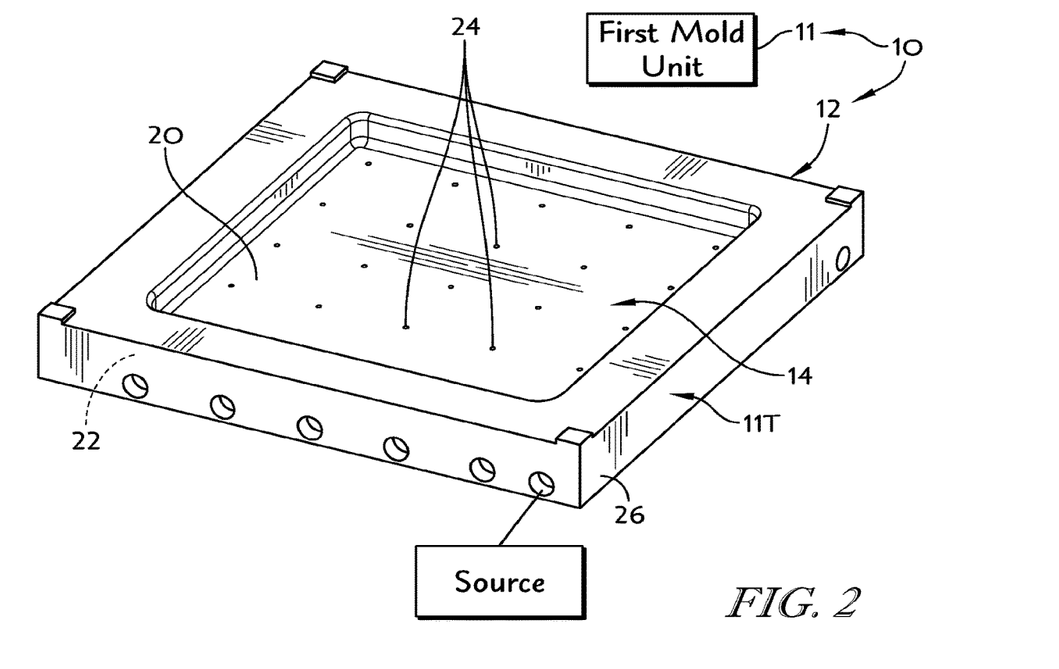
FIG. 2 is perspective view of a simplified mold tool in accordance with the present disclosure showing an array of 1/16 of an inch holes formed in an inner surface of the mold tool for hot air to flow into a mold cavity and suggesting that the mold tool is heated by an external source.
Figure 4:
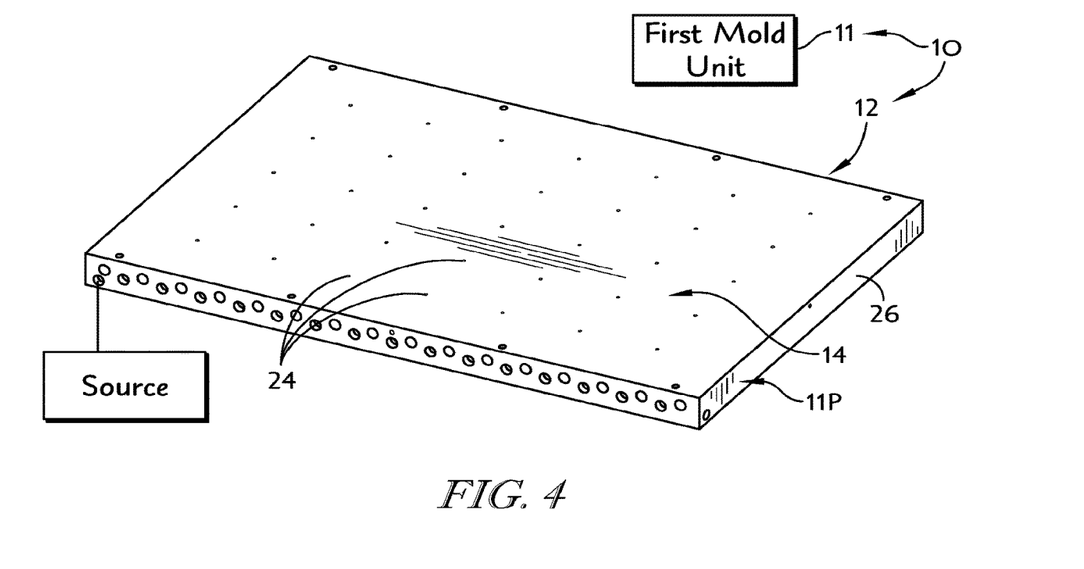
FIG. 4 is a perspective view of a heated platen in accordance with the present disclosure showing an array of holes formed in an inner surface of the platen for communicating a hot gas into an uncured part.

The array 24 of holes formed in the inner surface 20 of the mold units 11, 12 are shown, for example, in FIGS. 2 and 4. The distance between each hole and a neighboring hole in the array of holes may vary. In one example, the distance is about 0.5 inches to about six inches. In another example, the distance is about one inch to about three inches.

In one example, the array of holes 24 for providing the hot pressurized gas may be formed only on one mold tool. A separate array of holes may be formed on the opposite mold tool to vent the pressurized gas after it passes through the uncured blank.

In another example, the array 24 of holes for providing the hot pressurized gas may be present on both mold tools. As a result, the pressurized gas may be vented along a perimeter of the uncured blank. Perimeter venting may be used where an uncured blank has a high density along a perimeter causing a high pressure drop of the hot gas. The perimeter edge may be perforated to minimize flow resistance and pressure drop.

The diameter of each hole in the array of holes may be dependent upon product appearance as dimpling by high velocity gas or embossing textures in high density areas of the molded part should be minimized. In one example, holes may have a diameter of about 1/64 of an inch to about 1/16 inch. In another example, vented set screws may be formed with a hole having a diameter of about 0.042 inches to about 0.156 inches. The diameter of holes included in the array of holes may be constant throughout or the diameter may vary from hole to hole.

A cured product in accordance with the present disclosure may be used for sound absorption or as a thermal shield. Sound absorption may be desired in flat architectural applications (i.e. wall system for office spaces and theatres) and contoured parts in automotive applications (i.e. hood liners). Some molded parts are used in Original Equipment Manufacturers (OEM) equipment for sound absorption (HVAC equipment, clothes washers, clothes dryers, dishwashers, etc.)

A cured product may have a width of about one inch to about six feet. A cured product may have a length of about two inches to about twelve feet. The cured product may have a thickness of about 1/8 of an inch to about two inches in one example. In another example, the cured product may have a thickness less than 1/8 of an inch and greater than two inches. The cured product may have a density of about 1 pound per cubic foot to about 50 pounds per cubic foot. In addition, the density of the cured product may vary throughout the cured product.

The cured product may be subjected to a molding temperature when the binder included in the molded part is being cured. The molding temperature may vary according to the fibers and binder used in the molded part. Each binder may have a different minimum molding temperature at which the binder cures. A maximum molding temperature is established at the point in which decomposition, melting, and thermal instability of the fibers, binder, and trim layers occurs. In one illustrative example, the molding temperature is about 200 degrees Fahrenheit to about 500 degrees Fahrenheit. As a result, the hot gas has a hot-gas temperature of about 200 degrees Fahrenheit to about 500 degrees Fahrenheit.

Figure 8:
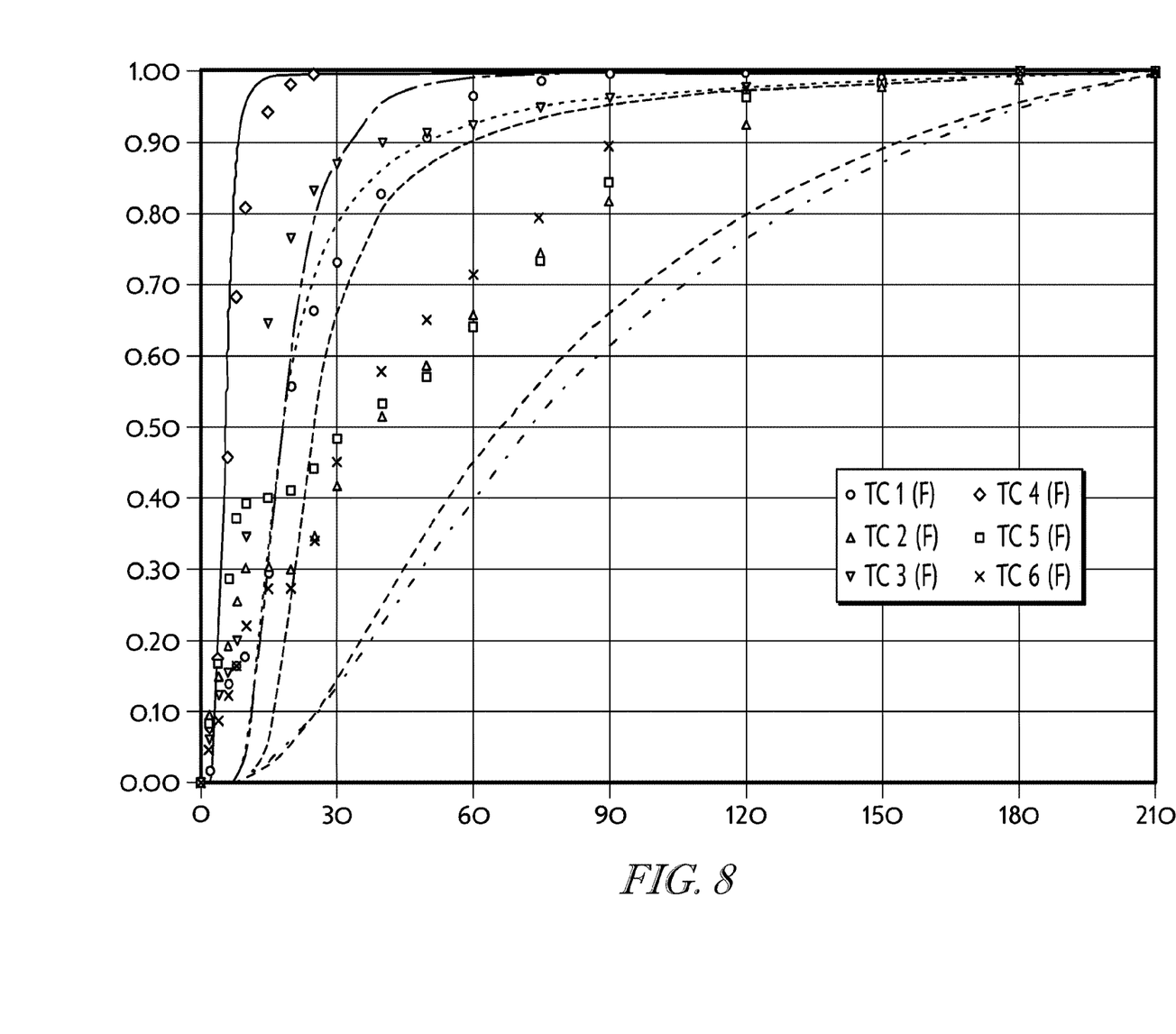
FIG. 8 is a graph showing temperature vs. time for several thermocouples (symbols) embedded in a molded part molded in a test mold tool as suggested in FIG. 9 and showing computational fluid dynamics model data for each corresponding location shown as a solid line with a color of each line matching a color of each symbol.
Figure 9:
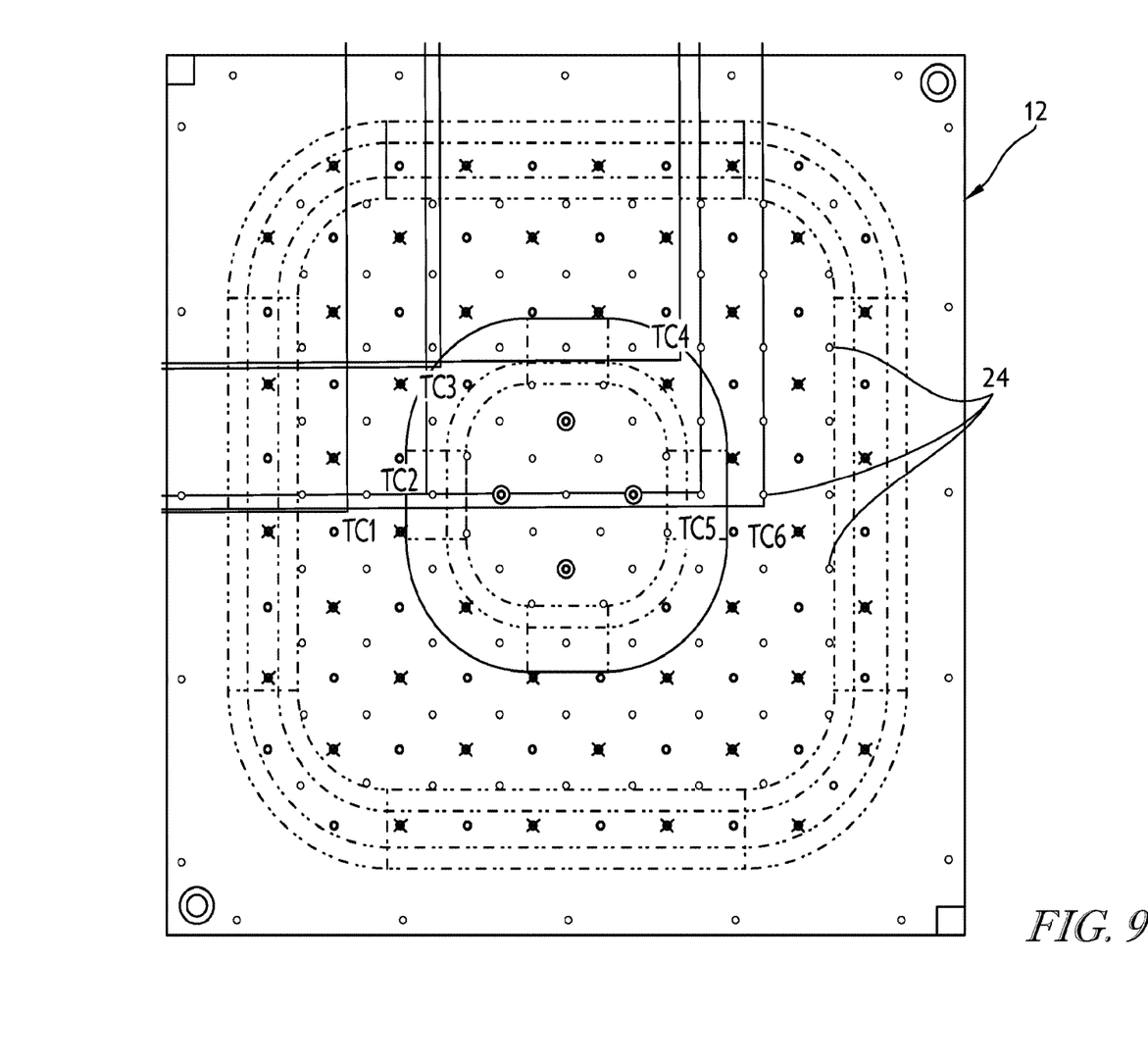
FIG. 9 is plan view of a test mold tool showing locations for each thermocouple used to prepare the graph of FIG. 8.
Figure 10:
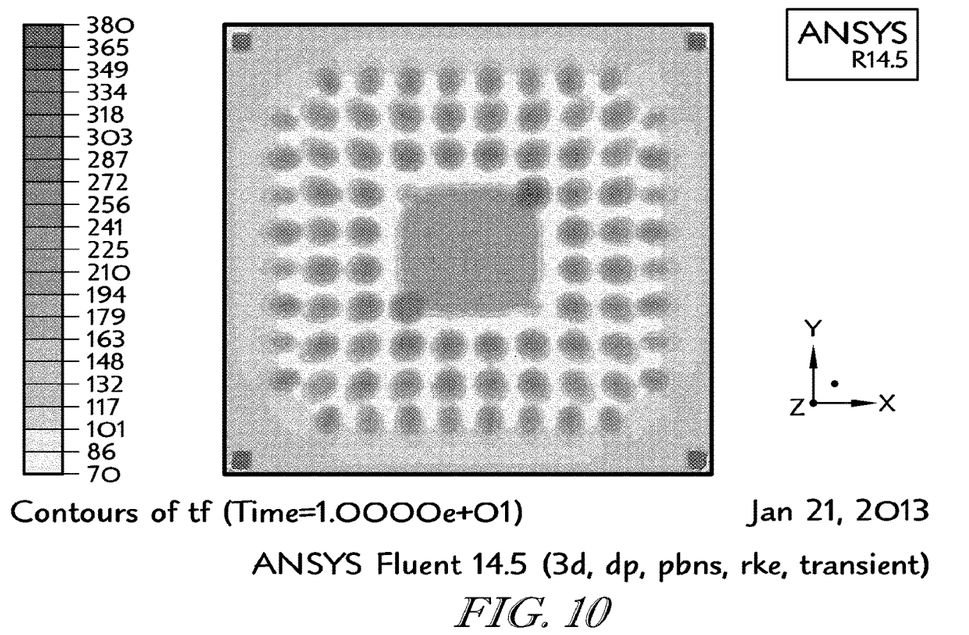
FIG. 10 is a photograph of a simulation showing temperatures at various locations in a sample mold tool during computational fluid dynamics modeling after about ten seconds.
Figure 11:
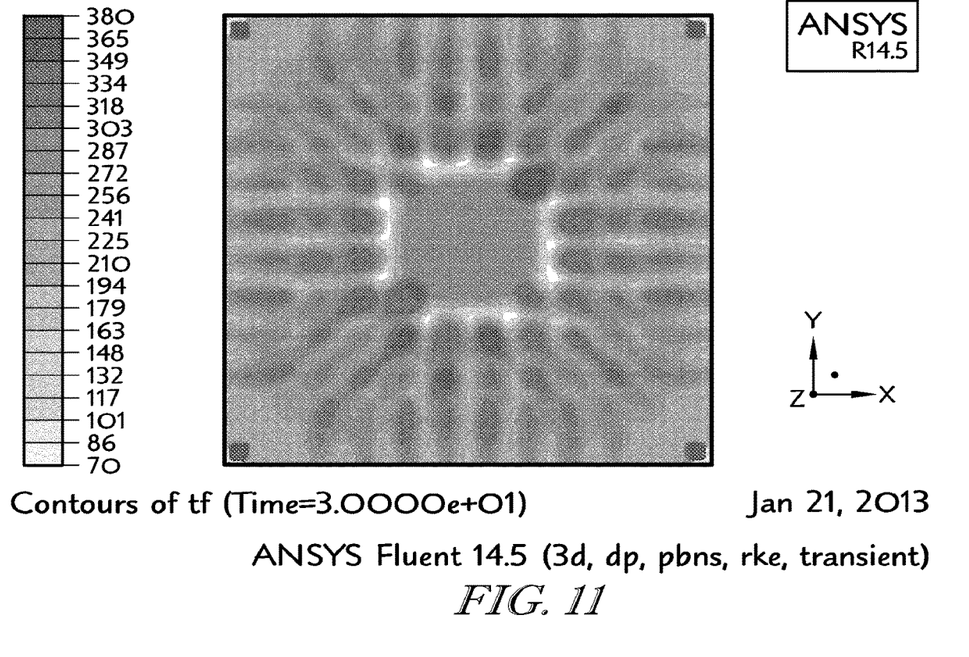
FIG. 11 is a view similar to FIG. 10 after about 30 seconds.
Figure 12:
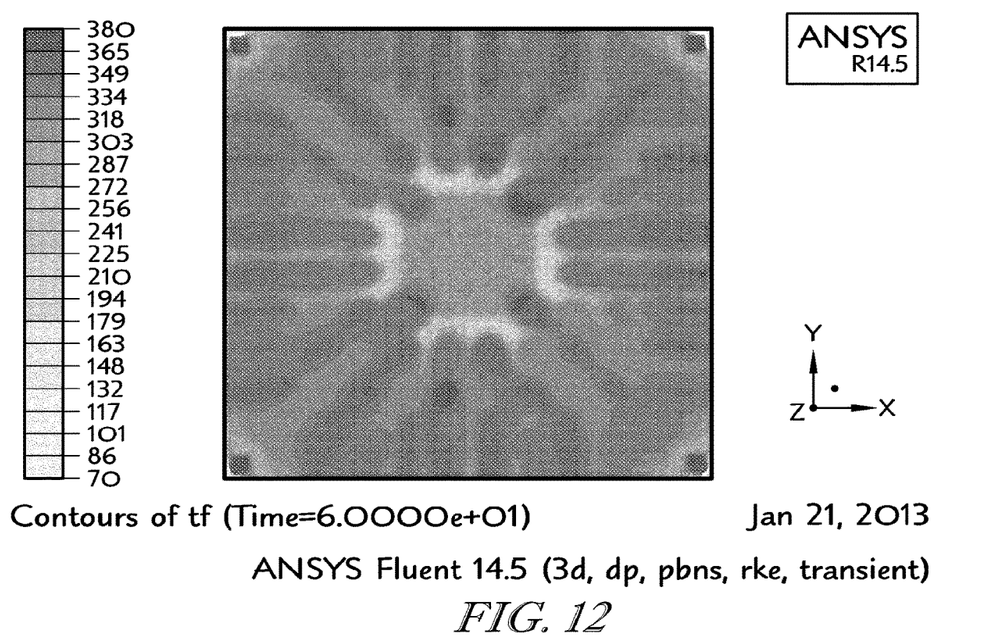
FIG. 12 is a view similar to FIG. 11 after about 60 seconds.
Figure 13:
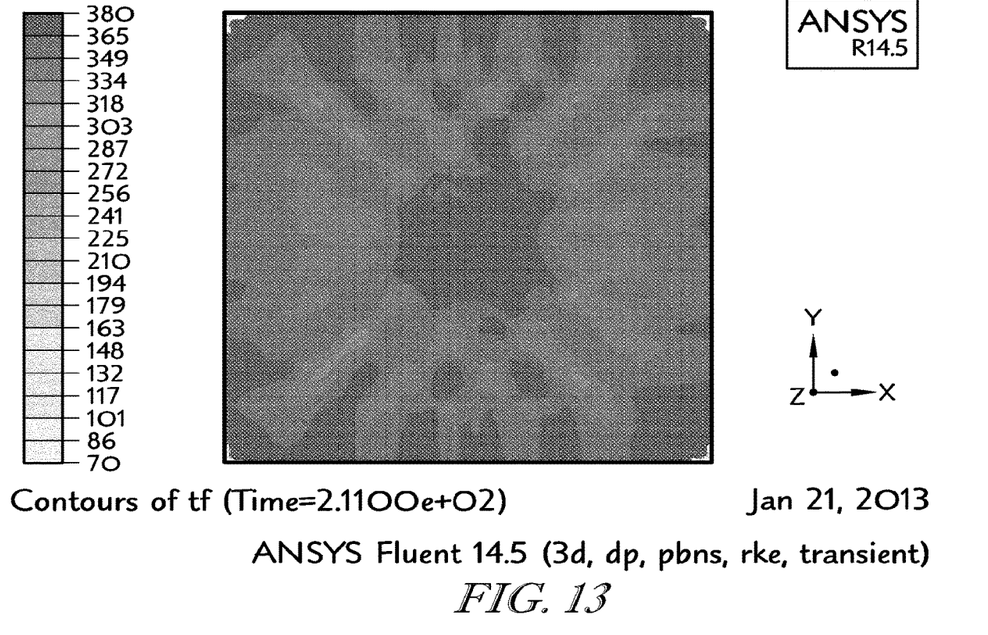
FIG. 13 is a view similar to FIG. 12 after about 210 seconds.
Figure 14:
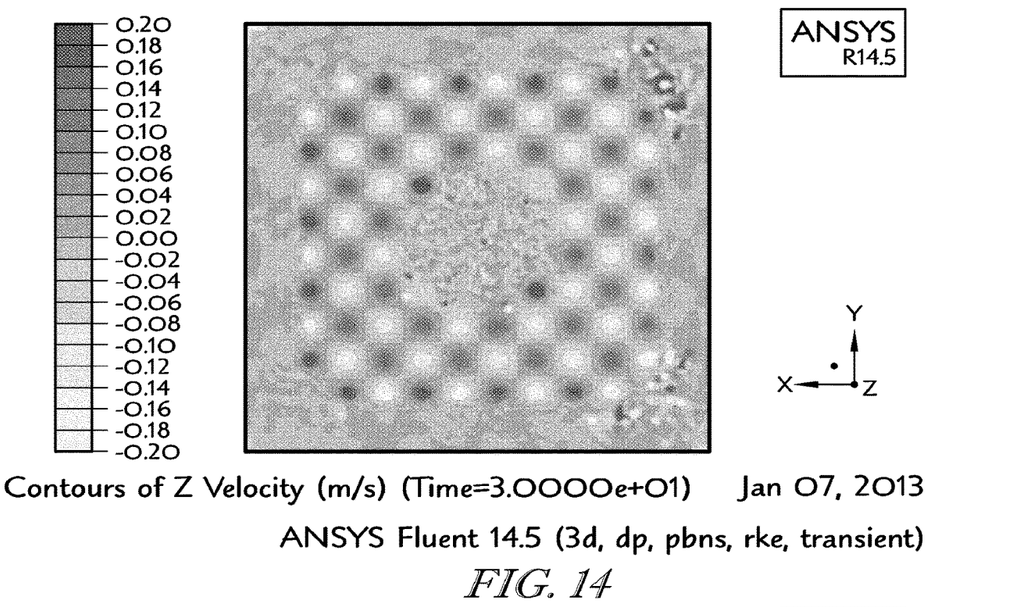
FIG. 14 is a photograph of a simulation showing fluid velocities on a center plane taken through the uncured product during computational fluid dynamics modeling after about 30 seconds.
Figure 15:
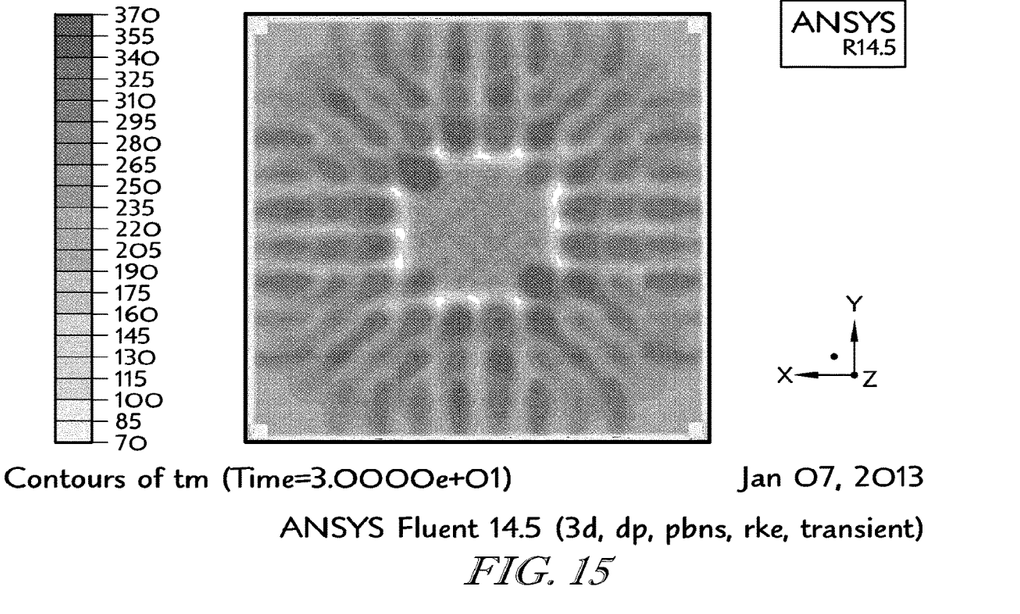
FIG. 15 is a photograph of a simulation showing molded part temperatures on the center plane during computational fluid dynamics modeling after about 30 seconds.
Figure 16:
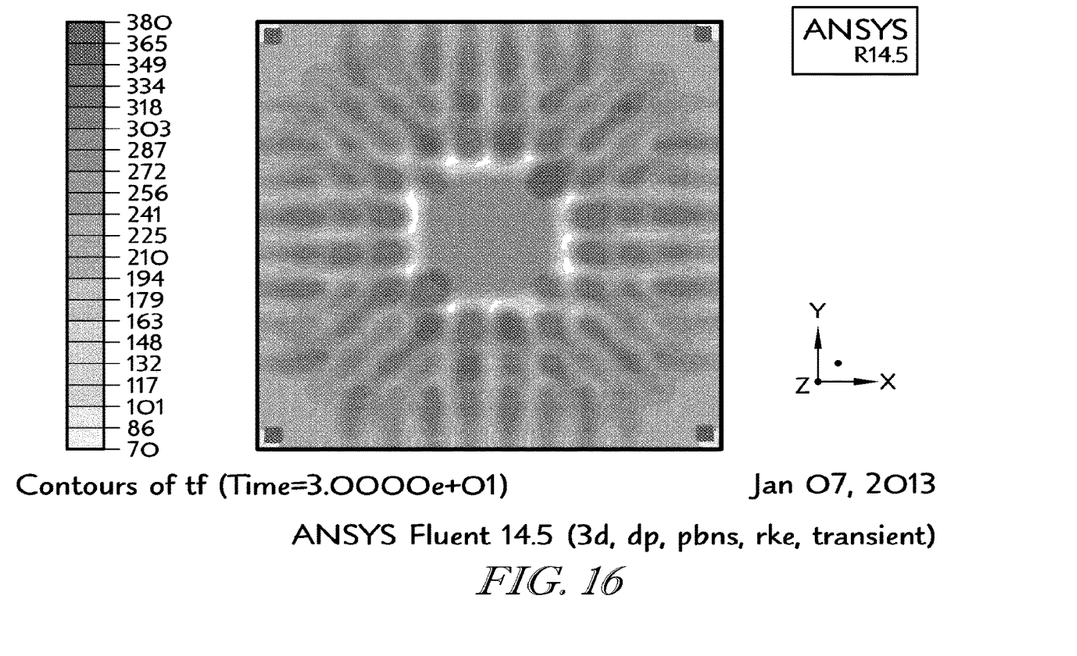
FIG. 16 is a photograph of a simulation showing hot gas temperatures on the center plane during computational fluid dynamics modeling after about 30 seconds.
Figure 17:
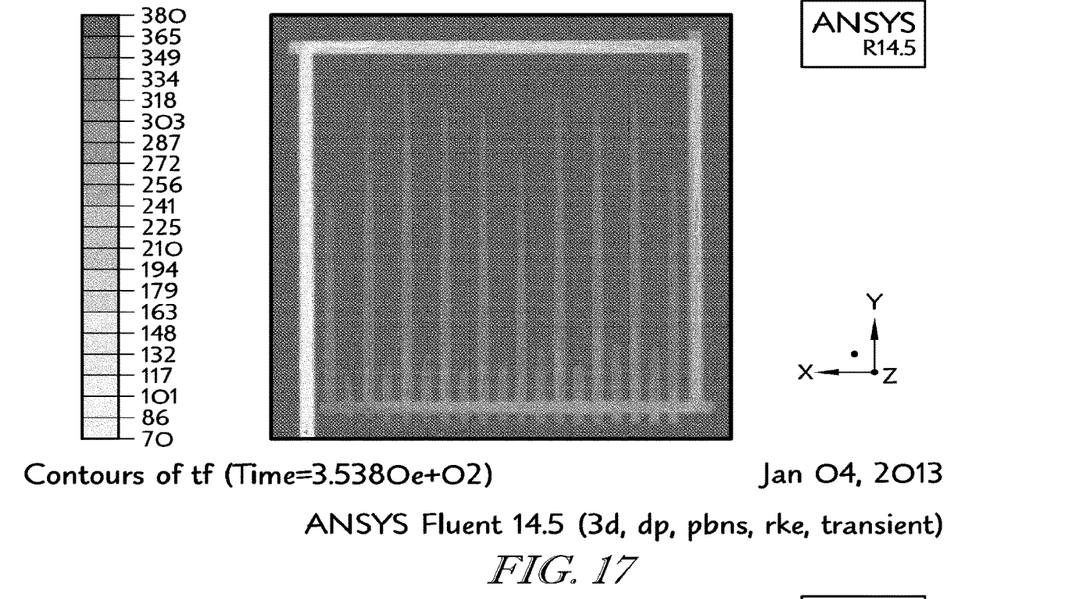
FIG. 17 is a photograph of a simulation showing gas temperatures as the gas moves through the passageways formed in the test mold during computational fluid dynamics modeling after about 353 seconds.
Figure 18:
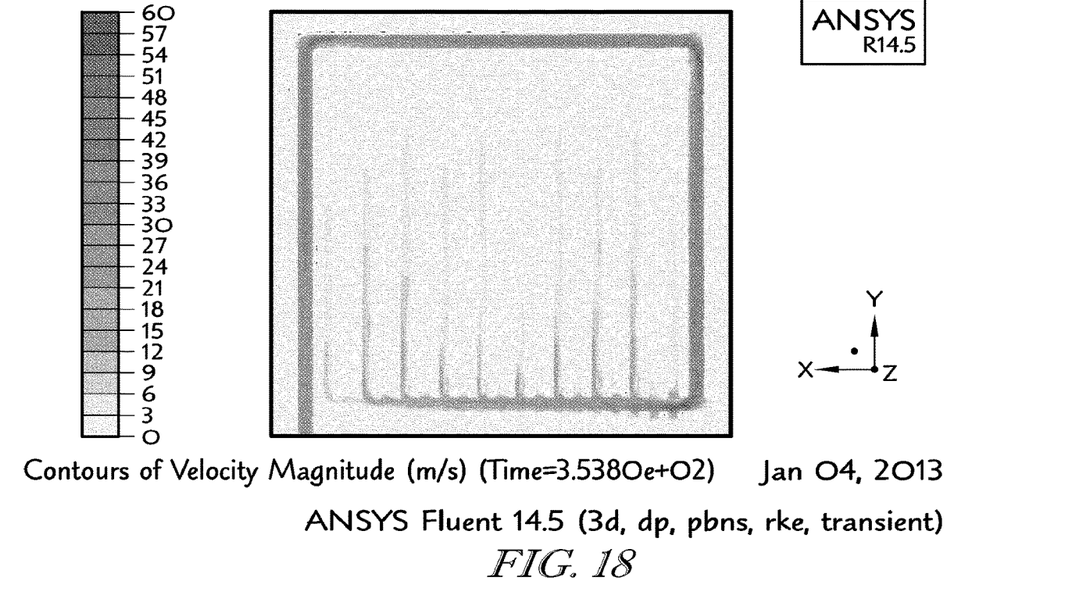
FIG. 18 is a photograph of a simulation showing gas velocities as the gas moves through the passageways formed in the test mold tool during computational fluid dynamics modeling after about 353 seconds.

A sample mold tool including six thermocouples TC1, TC2, TC3, TC4, TC5, TC6 was used for testing and modeling heat transfer and temperatures of a sample molded part and is shown in FIG. 9. During a test, an outer surface of each mold tool was heated to about 400 degrees Fahrenheit. Cool air flowing at a rate of about 16.8 scfm and about 74 degrees Fahrenheit was admitted to the mold tools to flow through the mold tool and absorb heat from the tool. The change in temperature for each thermocouple TC1, TC2, TC3, TC4, TC5, TC6 is shown over a time span of about 210 seconds in a graph shown in FIG. 8. Also, a computational fluid dynamics model of the test mold tool and molded part was prepared and the results are shown as solid lines on the graph of FIG. 8. Each thermocouple TC1, TC2, TC3, TC4, TC5, TC6 is shown as a different symbol having a different color. The modeled temperatures are shown with colors matching the associated thermocouple locations. In general, both the overall trend of the model and the test match; indicating predictable, reproducible results as suggested in FIG. 8.

What is claimed is:

1. A method of making a molded mineral wool insulation product using a molding process comprising:

providing a mold system comprising a first mold unit and a second mold unit, the second mold unit being coupled to the first mold unit to move relative to the first mold unit between a closed position in which a mold cavity is defined between the first and the second mold units and an opened position in which the second mold unit is spaced apart from the first mold unit, wherein: i) the first mold unit is formed to include a first passageway in fluid connection with a source of cool compressed air and to include an array of holes formed in the first mold unit that are arranged to open into the first passageway so that the first passageway communicates with the mold cavity, and ii) the second mold unit is formed to include a second passageway in fluid connection with the source of cool compressed air and to include an array of holes formed in the second mold unit that are arranged to open into the second passageway so that the second passageway communicates with the mold cavity;

arranging an uncured blank in the mold cavity, the uncured blank including mineral wool fiber and uncured binder, heating the first mold unit with hot oil, electrical resistance, heated platens, or any combination thereof, injecting cool compressed air from the source of cool compressed air into the first passageway of the first mold unit, transferring heat from the heated first mold unit to the cool compressed air in the first passageway to establish hot compressed air therefrom in the first passageway, and injecting the hot compressed air from the first passageway into the mold cavity in which the uncured blank is arranged;

heating the second mold unit with hot oil, electrical resistance, heated platens, or any combination thereof, injecting cool compressed air from the source of cool compressed air into the second passageway of the second mold unit, transferring heat from the heated second mold unit to the cool compressed air in the second passageway to establish hot compressed air therefrom in the second passageway, and injecting the hot compressed air from the second passageway into the mold cavity in which the uncured blank is arranged; and transferring heat from the hot compressed air to the uncured blank and further transferring heat by conduction from the first mold unit and from the second mold unit to the uncured blank to cause the uncured binder to cure and establish a cured product.

2. The method of claim 1, wherein the uncured binder is substantially free of formaldehyde.

3. The method of claim 1, wherein the cool compressed air has a temperature of no more than about 80 degrees Fahrenheit.

4. The method of claim 1, wherein the hot compressed air injected from the first and second passageways into the mold cavity has a temperature of about 200 degrees Fahrenheit to about 500 degrees Fahrenheit.

5. The method of claim 1, wherein the cool compressed air has a temperature of no more than about 80 degrees Fahrenheit and wherein the hot compressed air injected from the first and second passageways into the mold cavity has a temperature of about 200 degrees Fahrenheit to about 500 degrees Fahrenheit.

6. The method of claim 1, wherein the hot compressed air from the first and second passageways has a pressure and flow rate configured to minimize dimpling and deformation of the uncured blank in the mold cavity.

7. The method of claim 1, wherein the first passageway includes a perimeter portion and a distribution portion, the perimeter portion being be arranged to extend around a perimeter of the first mold unit to cause heat to be transferred from the heated first mold unit to the cool compressed air to establish the hot compressed air therefrom, and the distribution portion being in fluid communication with the perimeter portion and in fluid communication with the array of holes formed in the first mold unit to cause the hot pressurized gas to be delivered to the mold cavity.

8. The method of claim 1, wherein the second passageway includes a perimeter portion and a distribution portion, the perimeter portion being be arranged to extend around a perimeter of the second mold unit to cause heat to be transferred from the heated second mold unit to the cool compressed air to establish the hot compressed air therefrom, and the distribution portion being in fluid communication with the perimeter portion and in fluid communication with the array of holes formed in the second mold unit to cause the hot pressurized gas to be delivered to the mold cavity.

9. The method of claim 1, wherein the hot compressed air is vented through a perimeter of the mold system after the hot compressed air has moved through the mold cavity.

10. The method of claim 1, wherein the first mold unit is formed to include a vent passageway in fluid connection with atmosphere surrounding the mold system and to include an array of vent holes formed in the first mold unit that are arranged to open into the vent passageway to cause the hot compressed air to be communicated from mold cavity to the vent passageway after the hot compressed air moves through the mold cavity.

* * * * *